UNITED STATES PATENT OFFICE.

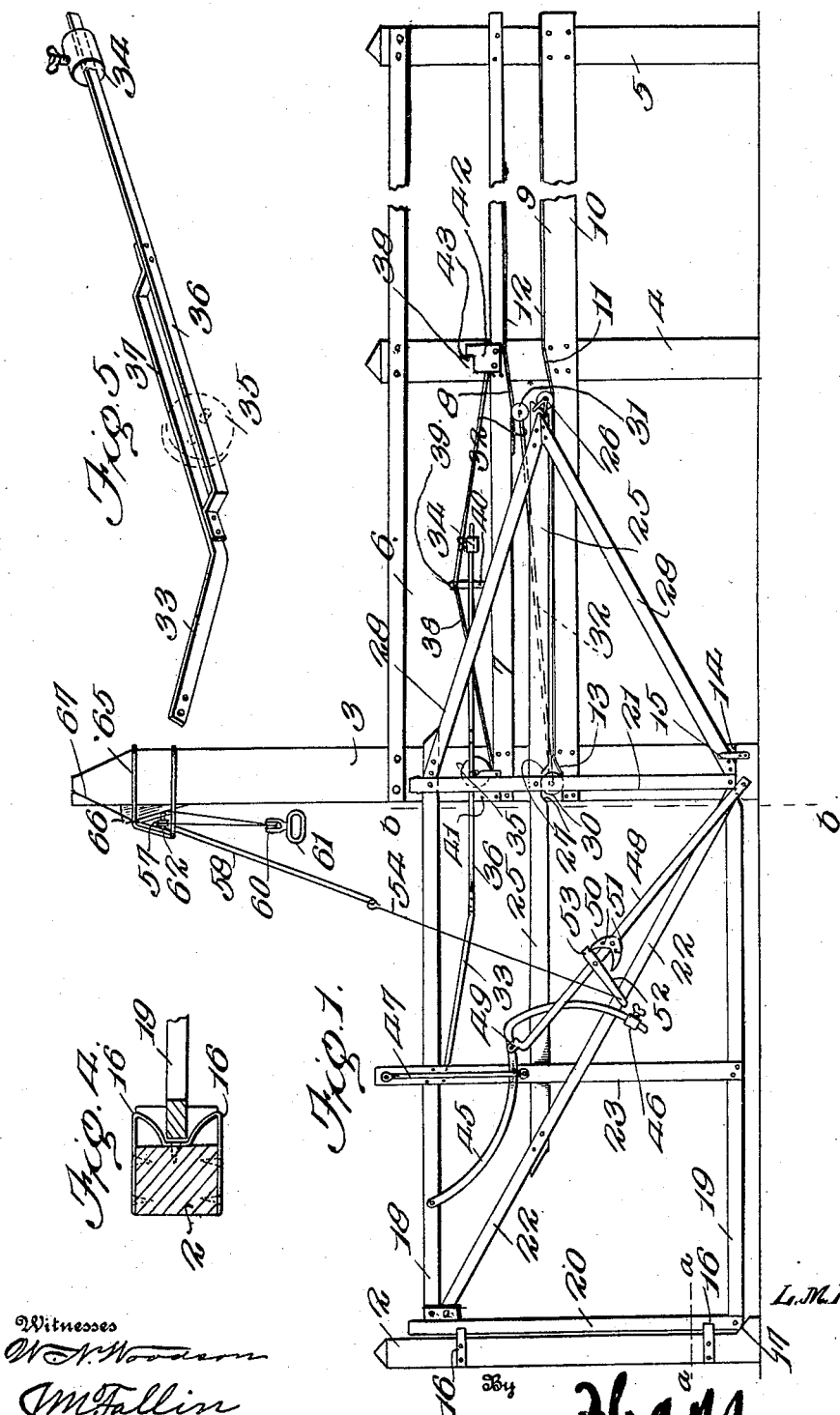

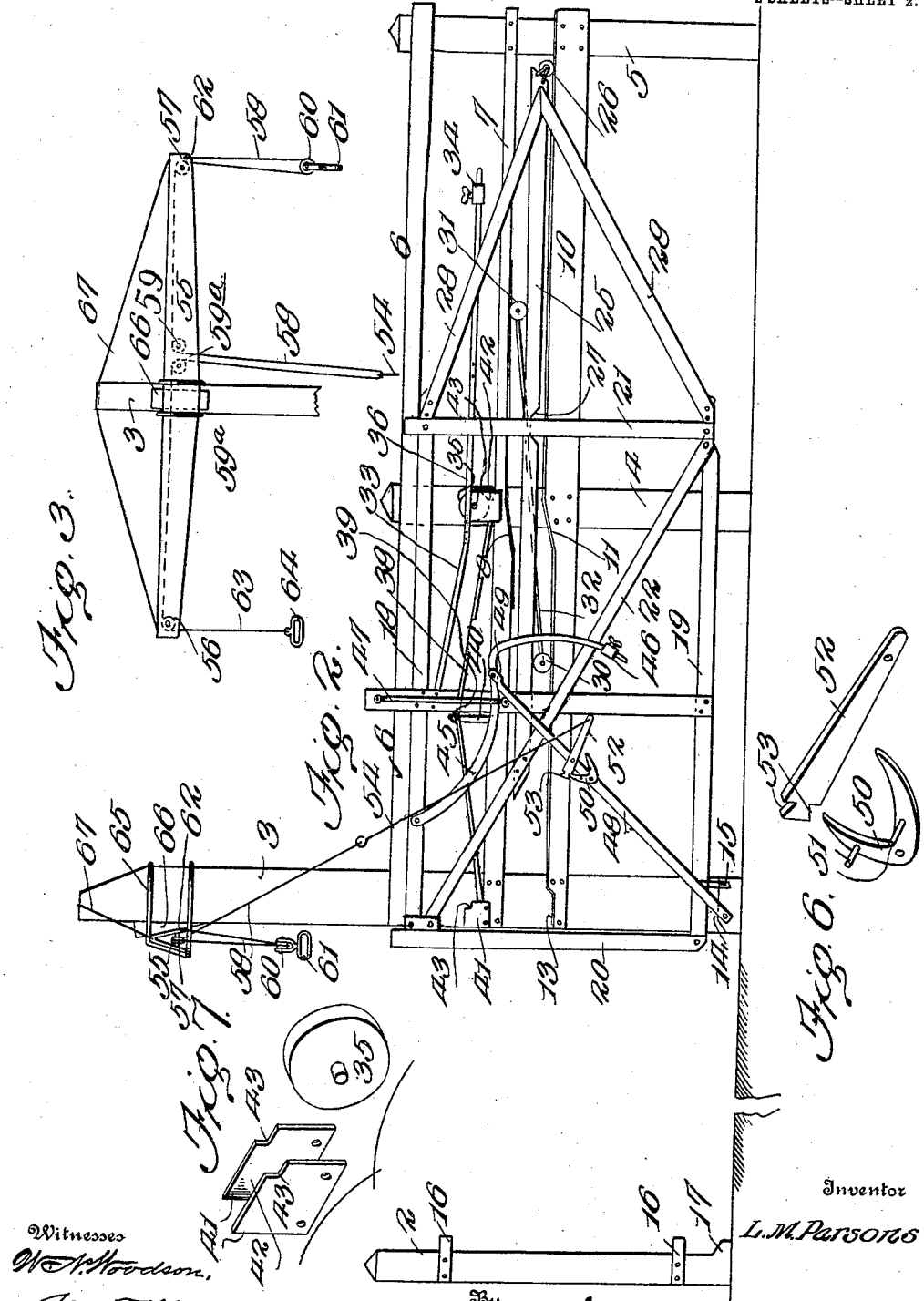

LOUIS M. PARSONS, OF NEWELL, IOWA.

SLIDING GATE.

966,047.  Specification of Letters Patent.  Patented Aug. 2, 1910.

Application filed May 18, 1909. Serial No. 496,763.

*To all whom it may concern:*

Be it known that I, LOUIS M. PARSONS, citizen of the United States, residing at Newell, Buena Vista county, and State of Iowa, have invented certain new and useful Improvements in Sliding Gates, of which the following is a specification.

My invention relates to gates which are mounted upon rails and adapted to slide laterally across the gate opening, and particularly to a sliding gate having means located on opposite sides of the gate and at various positions therefrom, whereby it may be easily opened or closed.

The invention consists broadly in the combination with fixed rails of a gate having rollers or sheaves engaging with the track rails, the gate being provided with a lever so attached thereto and so connected to the gate pulls or handles that a downward draft on the handles shall exert a rearward draft on the gate when closed, or a forward draft on the gate when opened.

The objects of my invention are to provide a gate of exceedingly simple construction having no weak joints or springs; wherein the principal working parts shall be strong and durable, and wherein the friction of the sliding gate is reduced to a minimum.

Further, I design to provide a gate which cannot easily stop on a center; wherein there shall be no downward pressure on the forward end of the gate, caused by operating levers; and which may be operated by a single cord or wire extending from any direction to the gate, as many of these cords being provided as may be found desirable or necessary, and extending in all directions from the gate.

Further, my object is to provide a gate which when closed is close to the ground, thus preventing the passage of small animals beneath the gate, but when operated to open the same, is raised from the ground so that it may easily slide rearward; and further to provide weighted means which shall act to assist the gate in its closing or opening movement, and which shall hold the gate in its closed or open position with sufficient force to prevent the gate being closed or opened by wind or any accidental actuation, but which shall permit the easy actuation of the pull through the gate post above referred to.

In the drawings I have illustrated in detail one form or embodiment of my invention, and have also shown views indicating certain modifications that may be made in the details of construction.

In the drawings, Figure 1 is a side elevation of one form of my gate, with the gate closed; Fig. 2 is a like view showing the gate open; Fig. 3 is an elevation of the cross bar and rear gate post, showing the manner in which the gate pulls are connected; Fig. 4 is a detail section on the line *a—a* of Fig. 1; Fig. 5 is a detail perspective of the arm which carries the roller operating upon the inclined track; Fig. 6 is a detail view of the latch and double pawl detached; Fig. 7 is a perspective view of the stop and supporting roller 30 detached from the gate.

Corresponding and like parts are referred to in the following description and indicated in all the views of the accompanying drawings by the same reference characters.

Referring now to the embodiment shown in Fig. 1 which represents most completely the principle of my device, 2 designates a gate post at the free end of the gate; 3 the gate post at the rear end of the gate, or defining one side of the gate opening; and 4 and 5 designate posts in line with the posts 2 and 3 which act to support the rails on which the gate moves and is in turn supported. The gate post 3 is taller than the gate post 2, for the purpose of supporting thereon the arms over which the gate pull operating cords may run. Attached to the posts 3, 4 and 5 on one side thereof, is the uppermost rail 6 which is of any desired construction and merely acts as a means for connecting the upper ends of the posts. Attached to the posts 3, 4 and 5, below the rail 6, is the track rail 7 whose upper edge is straight from the post 3, to the post 5, the lower edge however, from a point just forward of the post 4, that is, at a point intermediate of its length, is cut away so as to form an upwardly inclined portion 8 and a rearwardly extending track portion 9. The lowermost track rail 10 is straight on its lower edge, but its upper edge which acts as the main supporting edge for the gate, is cut away reversely to the rail 7, that is, the forward end of the rail 10 is lower in level than the rear edge thereof, whereas with the rail 7, the forward end thereof has its lower edge lower in plane than the edge of the rear portion. This provides an inclination 11 which corresponds to the inclined portion 8 of the rail 7. Preferably, the lower edge of the rail 7 and the upper edge of the rail 10 have attached thereto the metallic tracks 12 to form a good surface over which the rollers or sheaves supporting the gate may run. The track 12 on the lower rail extends from the forward end thereof to the rear end thereof, but that on the upper rail extends only a portion of the distance, as illustrated in the drawings. The forward extremity of the rail 10 is cut away at its forward end so as to form a recess 13, the rear end of which is upwardly inclined to the level of the rail 10. The lower end of the post 3 is provided with an outwardly projecting plate 14 having thereon the upwardly projecting finger 15, for a purpose to be later described. The gate post 2 is provided on its inner face with gate-engaging projections 16, preferably made of metallic strips having the general form of the letter W, and the lower end of the gate post is formed with a projecting block 17 upon which the forward end of the gate rests when the gate is closed.

The gate is composed of the upper and lower bars 18 and 19, the vertical bar 20 connected at its ends to the bars 18 and 19, the rear vertical bar 21 connected at its ends to the bars 18 and 19, the diagonal brace 22, and the intermediate vertical bar 23 which is attached at its lower end to the bar 19 and projects above the bar 18 to which it is attached. Projecting rearward from the gate and attached at its ends to the bars 22, 23 and 21, is the bar 25 which at its extremity carries the roller 26 which runs on the track rail 10. The middle of the bar 25 is recessed as at 27, this recess being coincident with the junction of the vertical bar 21, and in the closed position of the gate, coming coincidently with the recess 13 in the forward end of the rail 10. The rear end of the bar 25 is connected by diagonal brace bars 28 with the upper and lower ends of the bar 21. Thus, the gate is formed with a rearward prolongation at the extremity of which is carried the roller 26. Located between the bar 25 and the rail 10 and normally resting in the recesses 27 and 13, is the free roller or sheave 30. This roller is not attached to either of the bars 25 or 10 and is not connected to the vertical bar 21. Therefore, as the gate moves rearward, the roller 30 will move up the inclined end of the recess 13 and will roll along the upper edge of the track rail 10, while at the same time, the bar 25 will ride upon the roller 30 and will have a rolling contact therewith. Thus, when the gate is moved rearward, it will be supported upon the roller 30 and upon the roller or sheave 26, and at the beginning of its rearward movement, the inclined ends of the recesses 27 and 13 and the inclination 11 cause the gate to rise until it reaches the level of the rear end of the track. While it is necessary of course to support the rear end of the gate upon the track 10, it is also necessary to prevent the rear end of the gate from rising, and to this end, the rail 7 is provided, and the roller or sheave 31 is freely supported above the bar 25 and under the track rail 7 so as to bear against the under edge of the track rail and the upper edge of the bar 25. This roller or sheave 31 is connected by a rod 32 to the roller 30, the ends of the rod being bent at right angles to the main portion thereof and forming bearings for the rollers 30 and 31. The purpose of the rod 32 is simply to hold the sheaves 30 and 31 in spaced relation to each other so that they shall always retain a proper distance. It will be seen that as the gate moves rearward and the rollers 26 and 30 move up the incline on the track rail 10, the roller 31 will also move up the incline 8 to accommodate the rise in the gate.

To assist in moving the gate from a middle position to either an entirely closed or an entirely open position, I provide the rearwardly extending rod 33 which is pivoted at its forward end in the upper end of the vertical bar 23 and just below its junction with the bar 18. The rear end of this rod is weighted as at 34, this weight being adjustable, and the intermediate portion of the rod is supported upon the axle of a roller or sheave 35. The intermediate portion of the rod 33 is preferably bifurcated, that is, it is formed with two opposed rails 36 and 37 between which the roller 35 rotates, these rails resting upon the axle of the roller 35. The purpose of this is to offset the rear end of the rod 33 from the forward end thereof so that the rear end of the rod and the weight 34 carried thereby shall not contact with a track upon which the roller 35 is designed to roll. This track is designated 38, and is composed of a metal strip attached to the forward end of the rail 7 on the upper edge thereof. This strip inclines upwardly to a point 39 and then downwardly to a level with the upper edge of the rear end of the rail 7, the strip 38 being held in this position by a strut 40. The forward end of the strip 38 is provided with a stop 41 consisting of opposed plates attached to each side of the rail 7 and projecting up into a position to engage the axle of the roller 35. The rear edges of these plates are beveled and then formed into a seat for the axle of the roller, as shown in the detail view, Fig. 10. The rear end of the strip 38 is also provided with a stop composed of opposed plates 42, the inner edges of which are cut away on an incline, as at 43, and formed into seats for the axle of the roller 35 so that this roller at the forward or backward limits of its travel will be engaged by the seats and will rise from the strip 38 so as to permit the rod 33 to roll along on the axle thereof without undue friction.

The operating mechanism of my gate consists of a pivoted arm 45 which is curved in the approximate form of an S, though this exact form is not essential. The arm is pivoted at its upper end to the bar 18 midway between the uprights 20 and 23. The arm is then downwardly and rearwardly curved and extends beyond the rear edge of the upright 23. It is then, in the embodiment shown in Fig. 1, downwardly and slightly forwardly curved, and is provided at its extremity with an adjustable weight 46. The rear end of the arm 45 is guided vertically against the bar 23 by the guide rod 47 which is attached at its ends to the inside face of the bar 23. Pivoted upon the lower portion of the gate post 3 and below the supporting plate 14, or upon the same, is the lever 48 which extends upwardly and forwardly and at its extremity is pivoted to the middle of the lever 45 by a clip 49 which provides for the lever 48 being offset in plane to the lever 45 and so provides for the easy passage of the curved extremity of the arm 45 and its weight past the lever 48. It will be seen that any upward pull upon the lever 48 will act to draw upon the pivoted arm 45, and that this will retract the gate. To provide a means for drawing upward upon the lever 48, I pivot upon the lever 48 a double or crescent shaped pawl 50 provided with projecting stops 51 on its inside face, these stops engaging on either side of the lever 48. In conjunction with the pawl, I provide a pivoted latch 52 which at its extremity is provided with notches 53, one on each side, which is engageable by the extremity of one or the other pawl 50, the outer end of the latch 52 being connected to a cord or rod 54 which in turn is connected to the gate pulls now to be described.

The gate post 3 at its upper end is provided with a cross bar 55, preferably formed in an inverted trough shape. This cross bar is rigidly attached to the upper extremity of the post 3 so as to extend transversely across the line of movement of the gate. One extremity of the cross arm 55 is provided with a pulley 56, while the other extremity is provided with a pulley 57. The cord 54 is attached to a flexible connection or cord 58 which passes upward to a pulley 59 mounted about the middle of the cross bar 55 and then extends from this pulley out to the end of the cross bar and over the pulley 57. The end of the cord is rove through a pulley 60 which carries a handle 61, the extremity of the cord or flexible connection being attached to the end of the cross bar 55, as at 62. Passing over the other pulley 56 is a cord 63 which is connected to a handle 64, passes up around the pulley 56, then around a pulley 59ª, and then downward to the cord 54 to which it is attached. It will be seen that I may attach either of the cords directly to the handles, or either of the cords may be rove through a movable pulley like that at 60, the arrangement shown including the movable pulley 60 of course acting to multiply the movement of the handle 61, so that a slight movement of the handle will cause twice as great a movement of the cord 54.

While I may attach the cross bar 55 to the post 3 in any desired manner, I preferably use a continuous rod 65 which extends around the post, then downward on both sides around the cross bar, and then around the post, the cross bar being wedged in position by a wedge 66 inserted between the cross bar and the post. The cross arm or bar 55 is further supported by a truss wire 67 which is attached at its ends to the arm 55 and passes over the upper end of the post 3. It will be of course obvious that the post 3 might be provided with a number of arms projecting in different directions which support cords and pull handles, all of these cords passing to the connection 54, and therefore the gate may be opened from any position, or by a suitable arrangement of cord supports, from any distance and in any direction, the construction being such that an upward pull upon the cord 54 will draw upward on the lever 48. This lever in its upward movement draws rearward on the arm 45 and on the gate itself, or if the gate is in its rearward position, reverses its movement so that the gate is drawn forward. In Figs. 1 and 2, I have shown two positions of the lever 48 and the arm 45, and indicated the positions of the gate. It will be seen then that when the gate is closed, an upward draft on the cord 54 will swing the lever 48 toward a vertical position, that this will cause the gate to move rearward, and that immediately upon its initial rearward movement, it will rise because of the fact that the rollers 26 and 30 move upward on the inclines 11 and 13. When the lever 48 has nearly reached its vertical position, the arm 45 will be at a slight incline to the horizontal, and the latch 52 will be still engaged with the pawl 50. When the lever 48 however has moved to the position shown in Fig. 2, and the draft upon the cord 54 is released, the pawl 50 will fall so that its opposed cusp will be in a position to engage the notched end of the latch. Upon now drawing upon the cord 54, the latch will engage with this uppermost cusp and will act to limit the movement of the latch so that the lever 48 will be drawn forward or turned upon its pivot, thus carrying the gate forward in a reverse manner to that before described.

It is pointed out that in the construction of the gate according to my invention, the weight 46 causes an upward lift of the front end of the gate when the gate is in either of its positions, thus permitting easier moving of the gate and accomplishing better results, even when the gate is a long, heavy one. Furthermore, the peculiar shape of the link 45 gives great effectiveness to the action of the gate. Because of the shape of this arm or link 45, the weight tends to give a forward or backward impetus to the gate, when the gate is at the center and needs this extra impetus. As the motion of the gate proceeds in either direction from the center, the force of the gate changes to an upward lift on the front end of the gate, and when the gate has reached either of its positions, the weight tends to hold the gate. While it would be possible to attach the cord 54 for operating the gate directly to the lever 48, the gate could then only be operated by a very vigorous movement. By using the outwardly projecting arm 52, a sufficient side draft is secured, when the gate is in either of its positions, to enable the gate to be easily pulled past the center, thus lessening the need for fast movement of the gate and preventing the stoppage of the gate exactly in the center. It will be seen that because of the fact that the arm 52 is pivoted and rotates after each movement of the gate until again caught by the pawl 50, the point of application of the force through the connection 54 is placed considerably to one or the other side of the lever 48, whether the gate be closed or open. Thus, by means of the arm 52, a greatly increased leverage is secured upon the lever 48 than would be the case were the connection 54 attached directly to the lever. If the connection 54 were attached directly to the lever, then when the lever was in its vertical position, the connection and the lever would be practically in line. As it is, however, when the lever is at its center, the connection 54 is engaged with it to one side so that a pull upon 54 will cause the lever to continue its movement past the center and in such position that the weight 46 will carry the lever completely over. This occurs whether the lever is being pulled to open or close the gate.

The use of flexible connections 54, 58 and 63 is important, for the reason that they permit the gate to be operated from any desired distance and from any desired direction, and furthermore, the lever, in moving over, does not have to lift any weighty object, as would be the case were levers or bars used for operating the gate. It will be seen that there is practically no weight which has to be lifted when the gate moves past its center.

As the gate is moving rearward, the roller or sheave 30 travels rearward along the track rail 10 toward the post 4, and the roller or sheave 26 travels back to the rearward extremity of the rail 10, and the roller or sheave 31 travels toward the post 5 for about half the distance between 4 and 5. The roller 30 comes to rest at a point just at the bottom of the incline 11 on the track 10 and immediately under the juncture of the bar 25 with the bar 23. When the roller 31 reaches its final rearward position, the gate has traveled so far rearward that the roller 31 is over the point of juncture of the bar 21 with the bar 25. The roller 35, meanwhile, travels on the track 38, and the axle of the roller approaches to the outer extremity of the bars 36 and 37. The operating bar 48 and the arm 45 pass on over the center and fall to the position shown in Fig. 2, it being further impelled to this position by the weight 46. The object of the bar 52 is to give an oblique pull until the bar 48 has passed over its center. The roller 35 passes the point 39 just before the gate reaches the center, and the axle of the roller 35 reaches the stop or rest 42 a little before the motion of the gate is finished, though the gate itself still rides upon the axle of the roller until the gate comes to rest. In closing, the roller 35 reaches the stop or rest 42 before the gate quite completes its motion, and the axle rests upon the seat formed in the stop 42, but the gate continues its motion until the rear end of the bars 36 and 37 engage with the axle of the roller, when the gate is opened. The roller 35 will move upward upon the strip 38, the arm 33 being pivoted for this purpose. This arm being pivoted, the roller 35 will offer very little resistance to the rearward movement of the gate, but as soon as the roller 35 has passed the highest point of the strip 38, the weight 34 bearing upon the axle of the roller, will tend to cause it to roll down the incline rearward of the point 39, and thus will assist in retracting the gate to its full extent. It will also be seen that the roller 30, upon a return movement of the gate, will drop into the recesses 27 and 13. When the gate is closed, its forward end is lowered so as to rest upon the block 17, while its rearward end is supported from sagging by the plate 14 and the finger 15.

It will be seen that this gate is self-locking when closed, and though not locked in an open position, yet the weight of the operating bar and the weight on the the bar 33 is sufficient to hold the gate against ordinary pressure. It will also be obvious that if it is pulled less than one-half from either its closed or open position, it will return when the pressure is released. After the gate moves back slightly and the roller 30 has rolled out of the recesses 13 and 27, the track rail 25 on the gate comes close up under the upper rear rail and thus prevents the gate from being raised from its lower track.

Having thus described the invention, what is claimed as new is:—

1. The combination with a sliding gate, of a lever pivoted at its lower end to a fixed point, a link pivoted to the upper portion of the gate, and pivoted to the free end of the lever and extending beyond the same, a weight on the free end of said link located on the extended portion thereof beyond the point of pivotal attachment to the lever, and connections whereby the lever may be rotated about the gate post pivot to open or close the gate.

2. The combination with a sliding gate, and a gate post at the rear thereof, of a lever pivoted at its lower end to the gate post, a link pivoted at one end to the upper portion of the gate and pivoted intermediate of its length to the extremity of said lever, the free end of said link extending beyond the point of attachment to the lever, and having a weight thereon, a cross-bar mounted on the gate post, pulleys on the cross-bar, and flexible operating connections passing through said pulleys and connected by a common connection to said lever.

3. The combination with a sliding gate and gate post at the rear end thereof, of a lever pivoted to the lower end of the gate post and extending forward and upward, a link arm pivoted at one end to the upper portion of the gate, the rear end of said arm being pivoted to the extremity of the lever, said arm having a weighted extension, a pulley mounted in the upper end of the gate post, a flexible connection passing over said pulley, an arm pivoted to the lever and connected at one end to said flexible connection, the other end of the arm being notched, and a double pawl pivoted on the lever, the arms of which are adapted to engage with one or the other of the notches on said pivoted arm when the lever is thrown into one or the other of its positions.

4. The combination with a sliding gate and gate post at the rear thereof, of a lever pivoted to the lower end of the gate post, a link arm pivoted to the upper portion of the gate, the extremity of the arm being pivoted to the said lever, an arm pivoted upon the lever, a pulley on the gate post, an operating connection passing over said pulley and attached to one extremity of the lever, and means for holding the arm fixed with relation to the lever until the lever has been thrown from one extreme position to its other extreme position, and thereby move the gate from one position to the other.

5. The combination with a sliding gate and a gate post at the rear thereof, of an operating lever pivoted at its lower end adjacent to the gate post, a link pivoted at its upper end to the gate, and pivoted intermediate its ends to the extremity of the operating lever, a flexible connection for rotating the operating lever upon its pivot to move the gate from a closed to an open position, and a weight on the free end of said link, beyond the point of attachment of the link to the lever and acting to move the lever from its middle or vertical position in one or the other direction.

6. The combination with a sliding gate, of a lever pivoted at its lower end to a fixed point, a link pivoted at its upper end to the gate and its lower end pivoted to the extremity of the lever, a cross-bar mounted above the gate, pulleys in the ends of the cross-bar, flexible connections passing over the pulleys, and means attached to the lever and to which the flexible connections are connected, whereby the power transmitted through the flexible connection may be applied to the lever at points on one side or the other of the longitudinal axis of the lever when the lever is in one position or in the other.

7. The combination with a sliding gate a gate post at the rear thereof, and rails upon which the gate slides, of a lever pivoted at its lower end to the gate post, a link pivoted at its upper end to the gate and at its lower end to the extremity of the lever and extending beyond said pivotal point, an adjustable weight on said extension, a cross bar on the gate, trough-shaped in section, pulleys mounted at the junction of the cross bar with the gate post, cords passing through said pulleys along the interior of said trough-shaped bar, and pulleys at the extremity of the cross bar over which said cords pass.

8. The combination with a sliding gate and gate post at the end thereof, and supporting rolls upon which the gate slides, of a lever pivoted at its lower end adjacent to the gate post, a link pivoted at its upper end to the gate, said link being pivoted to the upper end of the lever, the link beyond its pivotal connection with the lever being downwardly bent, an adjustable weight supported upon the downwardly bent extension of the link, and flexible connections attached to the lever, whereby the lever may be operated to shift the gate in either direction.

9. The combination with a sliding gate and gate post at the rear thereof, and rolls upon which the gate is supported and slides, of a lever pivoted at its lower end to the gate post, a link pivoted at its upper end to the upper portion of the gate, said link being pivoted to the free extremity of the lever, the link, beyond its point of attachment to the lever, extending downward and toward the front of the gate, an adjustable weight mounted on the extending portion of the link, and a flexible connection attached to the lever and acting to rotate the lever upon its pivot to shift the gate in either direction.

10. The combination with a sliding gate and gate post at the rear thereof and higher than the gate, and rolls upon which the gate is supported and slides, of a lever pivoted at its lower end adjacent to the gate post, a link pivoted at its upper end to the upper portion of the gate, forward of the middle of the gate, said link extending downward and rearward and being then pivoted to the upper end of the lever, said link, beyond the point of pivotal attachment to the lever, being curved downward and toward the front edge of the gate, an adjustable sliding weight on said extension, a cross bar mounted on the gate post, operating cords supported on said cross bar and having opposed handles on either side of the gate, a pivoted arm attached to the lever and connected to said operating cords, and means for holding the arm in an angularly projecting position with relation to the lever until the lever has been thrown from one extreme position to its other extreme position, to thereby move the gate from one position to the other.

11. The combination with a sliding gate, of a lever pivoted at its lower end to a fixed point, a connection between said lever and the gate whereby the gate may be shifted as the lever is rotated, a handle mounted above the gate, a flexible connection from the handle to the lever, and means whereby the power transmitted through the flexible connection may be applied to the lever at a point on one side of the longitudinal axis of the lever opposite to the direction of the flexible connection.

12. The combination with a sliding gate, of a lever pivoted at its lower end to a fixed point, a connection between the lever and the gate, whereby the gate may be shifted upon a rotation of the lever upon its pivot, a handle mounted above the gate, a flexible connection upon the handle, a member pivoted to the lever to the extreme of which the connection is attached, and means for detachably locking the pivoted member in angular positions opposite in direction to each other at opposite ends of the arc of movement of the lever.

In testimony whereof I affix my signature in presence of two witnesses.

LOUIS M. PARSONS. [L. S.]

Witnesses:
GEORGE MILLER,
JAY L. TAYLOR.